US006768227B1

(12) United States Patent
Liu

(10) Patent No.: US 6,768,227 B1
(45) Date of Patent: Jul. 27, 2004

(54) DIGITAL CONTROLLED POWER REGULATION DEVICE

(75) Inventor: Daniel Liu, Taipei Hsien (TW)

(73) Assignee: Prodigit Electronics Co., Ltd., Taipei Hsien (TW)

( * ) Notice: Subject to any disclaimer, the term of this patent is extended or adjusted under 35 U.S.C. 154(b) by 3 days.

(21) Appl. No.: 10/347,883

(22) Filed: Jan. 22, 2003

(51) Int. Cl.$^7$ .................................. G05F 1/10
(52) U.S. Cl. ........................ 307/98; 307/100
(58) Field of Search .................. 307/100, 98, 125, 307/127, 130; 323/239, 209, 211, 235

(56) References Cited

U.S. PATENT DOCUMENTS 3,832,626 A * 8/1974 Stut .......................... 323/235

* cited by examiner

*Primary Examiner*—Shawn Riley
(74) *Attorney, Agent, or Firm*—Rosenberg, Klein & Lee

(57) ABSTRACT

A power regulation device is connected between a power source and a load for receiving receive first voltage from the power source and providing a second voltage to the load. The power regulation device includes a first voltage detection circuit for detecting the first voltage and a second voltage detection circuit for detecting second voltage. A controller receives signals representing the first and second voltages and compares the signals with preset references to issue control signals. A switch circuit is connected between the power source and the load and is coupled to and controlled by the controller. The switch circuit is controlled by the control signals of the controller to change from the first state to a second state for selectively passing the first voltage and inducing different levels of the second voltage which are associated with different powers supplied to the load.

11 Claims, 4 Drawing Sheets

US 6,768,227 B1

DIGITAL CONTROLLED POWER REGULATION DEVICE

BACKGROUND OF THE INVENTION

1. Field of the Invention

The present invention relates generally to a control device for regulating alternate current (AC) power output, and in particular to a power regulation device that is digitally controlled.

2. Description of the Prior Art

AC power regulation is conventionally realized by using a triac. A triggering circuit controls the conducting angle of the triac for controlling the power transmitted to a load. Since this is analog control, rather than digital control, only simple control can be achieved, such as the application to dimmer.

In the transmission of AC power, electrical current flows through a long electrical wire to reach nodes of end users. Since there are a great number of end user nodes located along the power transmission line, the voltage that actually sensed at the end user nodes are different from node to node. The node that is located upstream may obtain a higher voltage, while that downstream has a lower voltage. In addition, the time when a peak amount of power is required, the voltage that the end user node may have is lower than that obtained in the time when a non-peak amount of power is required.

Due to such a variation that is encountered by all the electrical power suppliers around the world, power-related regulations provide an allowance for variation of the voltage supplied to the end user nodes, such as ±10%~±20%. Based on such a regulation of acceptable variation of power supply, electrical manufacturers make electrical appliances that have a rating power corresponding to the regulation-accepted power variation.

It is thus aimed to provide a power regulation device that reduces the variation in order to ensure proper operation of the electrical appliances.

SUMMARY OF THE INVENTION

Thus, an object of the present invention is to provide a digital control device for regulating AC power that is supplied to a load.

Another object of the present invention is to provide a digitally controlled power regulation device connected between a power source and a load wherein the power regulation device detects an output voltage of the power source and provides a voltage having a lower level to a load when the detected output voltage of the power source is beyond a preset reference.

A further object of the present invention is to provide digital control device for saving power consumption by comparing input voltage with a preset reference and automatically regulating an output voltage based on the result of comparison.

To achieve the above objects, in accordance with the present invention, there is provided a power regulation device connected between a power source and a load for receiving receive a first voltage from the power source and providing a second voltage to the load. The power regulation device comprises a first voltage detection circuit for detecting the first voltage and a second voltage detection circuit for detecting the second voltage. A controller receives signals representing the first and second voltages and compares the signals with preset references to issue control signals. A switch circuit is connected between the power source and the load and is coupled to and controlled by the controller. The switch circuit is controlled by the control signals of the controller to change from a first state to a second state for selectively passing the first voltage and inducing different levels of the second voltage which are associated with different powers supplied to the load.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
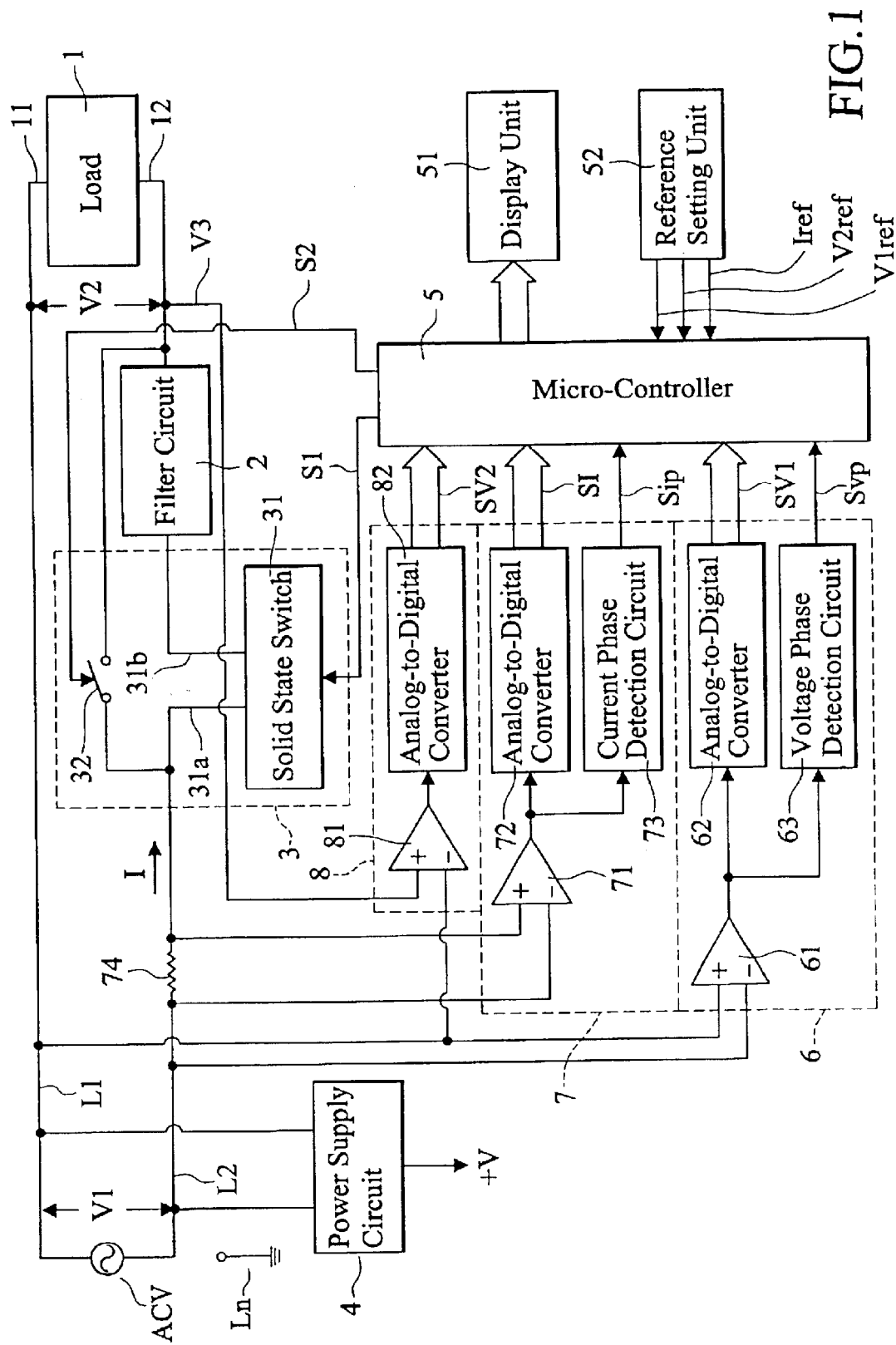
FIG. 1 is a block diagram of a digital control device constructed in accordance with the present invention.

With reference to the drawings and in particular to FIG. 1, a digital control device constructed in accordance with the present invention is connected between an alternate current (AC) power source ACV having first and second power lines L1, L2 and a load 1 having first and second terminals 11, 12. The AC power source ACV supplies a power side voltage V1 across the power lines L1, L2, while a load side voltage V2 is applied between the first and second terminals 11, 12. The first terminal 11 of the load 1 is directly connected to the first power line L1 while the second terminal 12 is connected to the second power line L2 by a filter circuit 2 and a switch circuit 3. The AC power source ACV also has a ground line Ln.

A power supply circuit 4 is connected to the first and second power lines L1, L2 to receive the power side voltage V1 and in turn provides an output voltage +V that is supplied to and powers a control circuit of the digital control device of the present invention.

The control circuit of the digital control device of the present invention comprises a micro-controller 5 that receives signals from other devices, processes the signals and performs control operations based on the result of signal processing. The micro-controller 5 comprises a display unit 51 for displaying information such as power side voltage, load side voltage, input power and output power.

The micro-controller 52 is connected to a reference setting unit 52 for providing setting parameters, calibration data and other parameters. For example, the reference setting unit 52 provides preset power side voltage reference V1ref, load side rating current Iref, load side voltage reference V2ref.

A power side voltage detection circuit 6 comprises a voltage amplifier 61 having two input terminals respectively connected to the first and second power lines L1, L2 for detection of the power side voltage level V1. The voltage amplifier 61 has an output terminal connected to an analog-to-digital converter 62 for converting an analog output of the voltage amplifier 61 into a digital signal SV1 that is applied to the micro-controller 5. A voltage phase detection circuit 63 is also connected to the output terminal of the voltage amplifier 61 for detection of the zero-crossing point of the power side voltage V1 and in response thereto, providing a power side voltage phase signal Svp to the micro-controller 5, which signal synchronizes the switching operation of the switch circuit 3 controlled by the micro-controller 5.

A load current detection circuit 7 comprises a load current amplifier 71 for detection of a current I flowing through the load 1. The load current amplifier 71 has an output terminal to which an analog-to-digital converter 72 is connected for converting an analog output signal of the load current amplifier 71 into a digital signal SI that is applied to the micro-controller 5. A current phase detection circuit 73 is also connected to the output terminal of the load current amplifier 71 for detection of the zero-crossing point of the load current I and in response thereto, providing a load current phase signal Sip to the micro-controller 5, which signal synchronizes the switching operation of the switch circuit 3 controlled by the micro-controller 5.

The detection of the load current I can be done by a current detection element 74 connected in series in the second power line L2. Opposite ends of the current detection element 74 are respectively connected to two input terminals of the load current amplifier 71. An example of the current detection element 74 is a resistor connected in the second power line L2.

A load side voltage detection circuit 8 comprises a voltage amplifier 81 has two input terminals respectively connected to the first power line L1 (which is directly connected to the first terminal 11 of the load 1) and the second terminal 12 of the load 1 for detection of the load side voltage feedback signal V3 whereby detection of the voltage that is actually applied to the load 1 can be realized. The voltage feedback signal V3, together with the load current I, allows the micro-controller 5 to obtain the power supplied to the load 1. An analog-to-digital converter 82 is connected to an output terminal of the voltage amplifier 81 for converting an analog output of the voltage amplifier 81 into a digital signal SV2 that is applied to the micro-controller 5.

The switch circuit 3 comprises a solid state switch 31, such as triac and IGBT, having terminals 31a, 31b connected in series with the second power line L2 and the filter circuit 2 whereby the solid state switch 31, the filter circuit 2 and the load 1 are connected in series. The solid state switch 31 is also coupled to the micro-controller 5 and is controlled by a switch control signal S1 issued by the micro-controller 5.

The switch circuit 3 further comprises a bypass switch element 32 that is connected between the second power line L2 and the second terminal 12 of the load 1 whereby the bypass switch element 32 is connected in parallel to the solid state switch 31 and the filter circuit 2. The bypass switch element 32 is also coupled to the micro-controller 5 and is controlled by a bypass switch control signal S2 issued by the micro-controller 5. When the bypass switch element 32 is closed, electrical power from the power source ACV is supplied to the load 1 via the bypass switch element 32 and the solid state switch 32 and the filter circuit 2 do not function.

Figure 2:
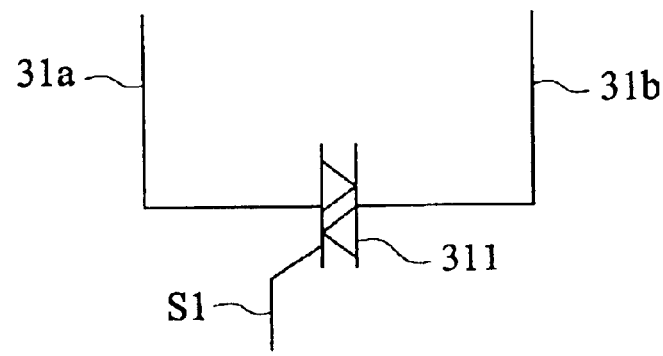
FIG. 2 is a circuit diagram of a first embodiment of a solid state switch employed in the digital control device of the present invention.
Figure 3:
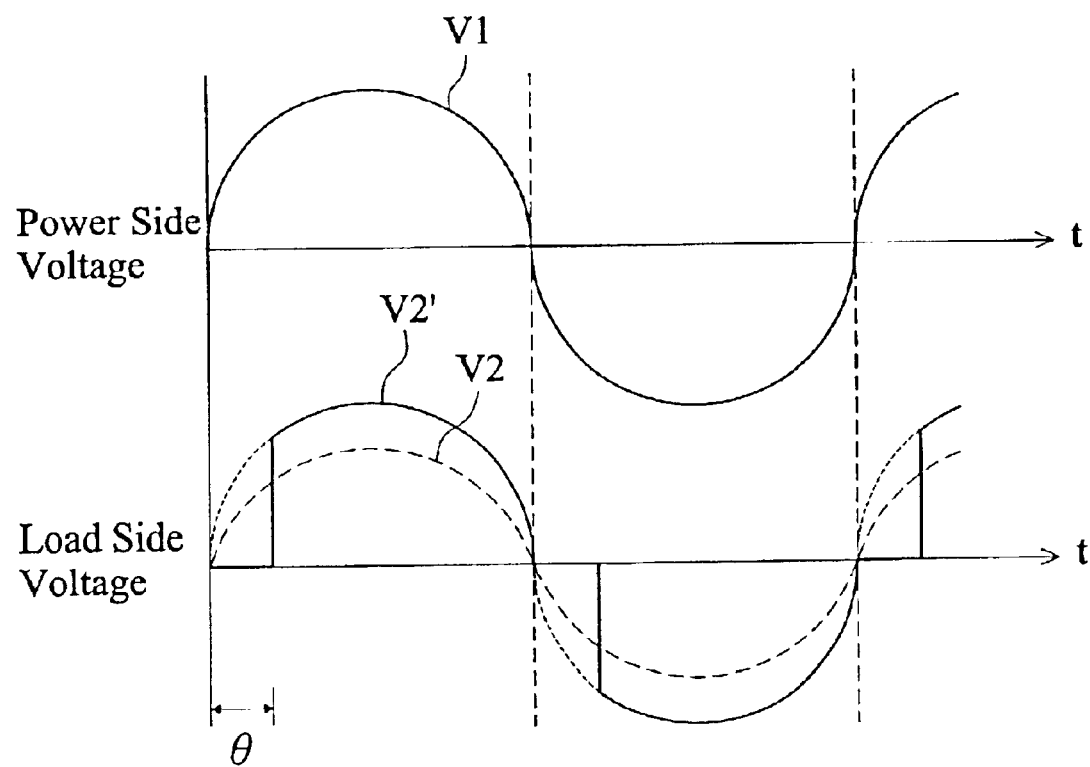
FIG. 3 shows plots of voltage waveforms in a power side and a load side associated with the first embodiment of the solid state switch.

FIG. 2 shows an embodiment of the solid state switch 31 and waveforms of the power side voltage V1 and the load side voltage V2 associated with the solid state switch 31 of FIG. 2 are shown in FIG. 3. In the embodiment illustrated in FIG. 2, the solid state switch 31 comprises a triac 311 functioning as a switching element. The triac 311 receives the switch control signal S1 from the micro-controller 5 and the conducting angle θ of the triac 311 is controlled by the switch control signal S1 whereby the overall power transmitted from the power source ACV to the load 1 is reduced and can be varied based on the selection of the conducting angle θ. The voltage V1 provided by the power source ACV is illustrated is illustrated in the upper plot of FIG. 3.

The power side voltage V1 that is processed by the switch circuit 3 becomes an intermediate voltage V2' as illustrated in the lower plot of FIG. 3 in which a portion of the voltage waveform is trimmed due to the conducting angle θ. The intermediate voltage V2' is then supplied through the filter circuit 2 and becomes the final voltage applied to the load 1, that is the load side voltage V2. Due to the trimmed portion of the intermediate voltage V2', the level of the load side voltage V2 is actually reduced as compared to the power side voltage V1. For example, the power side voltage V1 is 115V AC, the resulting load side voltage V2 is 105V AC.

Figure 4:
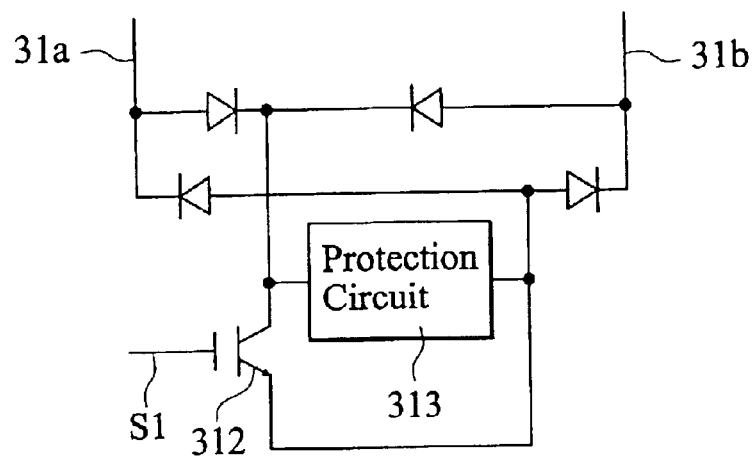
FIG. 4 is a circuit diagram of a second embodiment of a solid state switch employed in the digital control device of the present invention.
Figure 5:
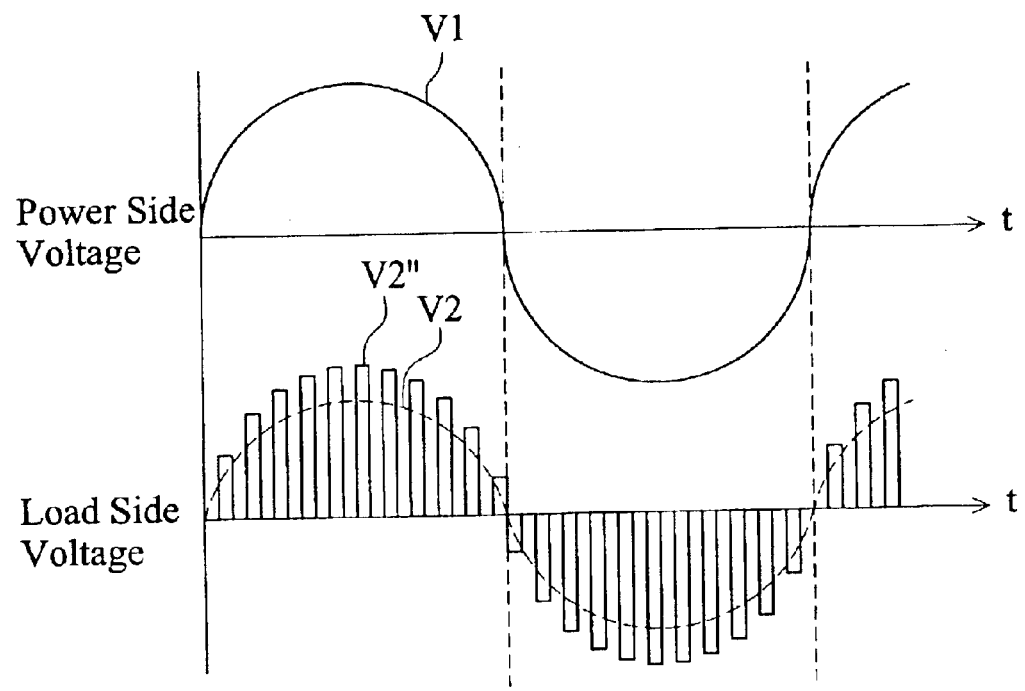
FIG. 5 shows plots of voltage waveforms in a power side and a load side associated with the second embodiment of the solid state switch.

FIG. 4 shows another embodiment of the solid state switch 31 and FIG. 5 shows waveforms of the power side voltage V1 and the load side voltage V2 associated with the solid state switch 31 shown in FIG. 4. In the embodiment illustrated in FIG. 4, the solid state switch 31 comprises a high speed transistor 312 functioning as a switching element. A protection circuit 313 is also included for protection of the high speed transistor 312 in case that the load 1 is an inductive load. The high speed transistor 312 is controlled by the switch control signal S1 from the micro-controller 5 to perform high speed ON/OFF switching, generating a series of pulses whereby the overall power transmitted from the power source ACV to the load 1 is reduced and can be varied based on duty cycle of the pulses. The voltage V1 provided by the power source ACV is illustrated is illustrated in the upper plot of FIG. 5. The power side voltage V1 that is processed by the switch circuit 3 becomes an intermediate voltage V2" as illustrated in the lower plot of FIG. 5 in which alternating portions of the voltage waveform are removed due to the duty cycle of the pulses. The intermediate voltage V2" is then supplied through the filter circuit 2 and becomes the final voltage applied to the load 1, that is the load side voltage V2. Due to the duty cycle of the pulses of the intermediate voltage V2", the level of the load side voltage V2 is actually reduced as compared to the power side voltage V1. For example, the power side voltage V1 is 115V AC, the resulting load side voltage V2 is 105V AC.

Figure 6:
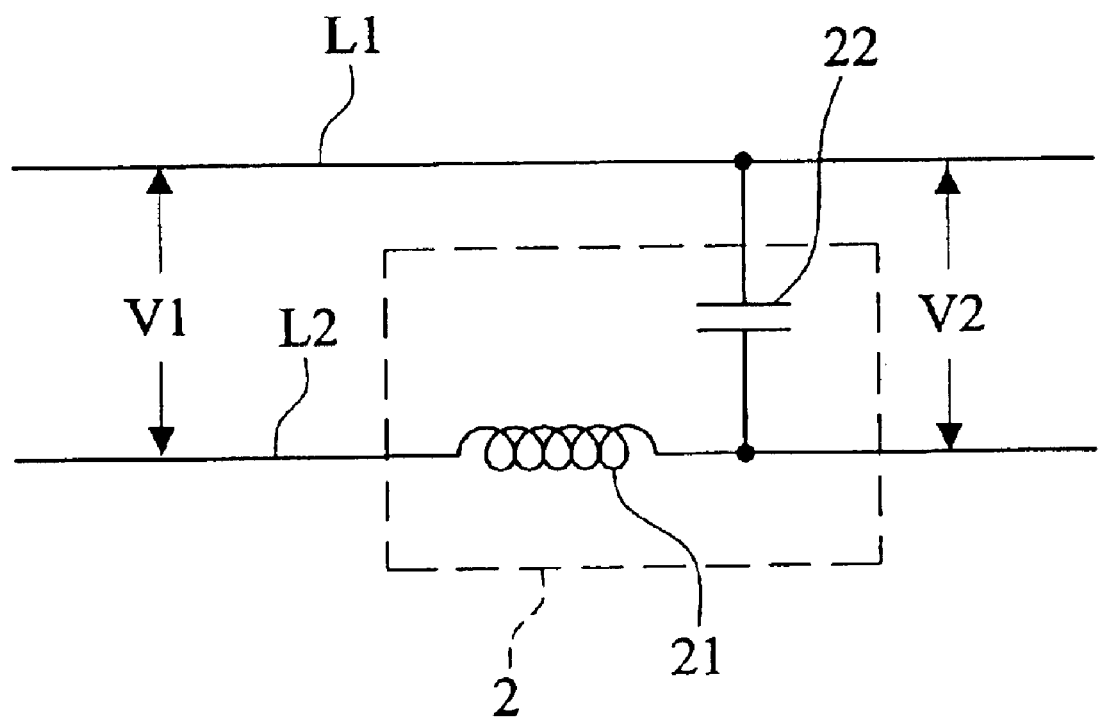
FIG. 6 is a circuit diagram of a filter circuit employed in the digital control device of the present invention.

FIG. 6 shows an embodiment of the filter circuit 2, comprising an inductor 21 and a capacitor 22 forming an LC circuit between the first and second power lines L1, L2. The filter circuit 2 is capable to remove surge of voltage transmitted from the switch circuit 3 to the load 1 and suppress interference. The intermediate waveform V2' (or V2") is processed by the filter circuit 2 to become a continuous waveform.

When the power side voltage detection circuit 6 and the load side voltage detection circuit 8 detect a power side voltage V1 greater than, such as 10% higher than, a preset power side voltage reference V1ref. The micro-controller 5 issues the switch control signal S1 to operate the switch circuit 3 with the bypass switch element 32 open, whereby a power side voltage V2 is induced on the load 1. An overall power associated with the load side voltage V2 is actually smaller than that of the power side voltage V1 as is described previously. Thus, the present invention provides a device for effectively regulating the power transmitted from a power source to a load. By selecting the reference values, the power supplied to the load 1 can be arbitrarily regulated and adjusted.

When the microcontroller 5 detects that the power side voltage V1 is smaller than, such as 10% lower than, the power side voltage reference V1ref, the micro-controller 5 issues the bypass switch control signal S2 to close the bypass switch element 32. Thus, the power side voltage V1 is no longer processed by the solid state switch 31 and the filter circuit 2 and is directly applied to the load 1, making the load side voltage V2 exactly the same as the power side voltage V1.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A power regulation device adapted to receive a first voltage from a power source and in response thereto generate a second voltage applied to a load, the power regulation device comprising:

a controller;

a reference setting unit coupled to the controller for providing a preset first and second voltage references;

a first voltage detection circuit for detecting the first voltage and providing a first signal representing the first voltage to the controller;

a second voltage detection circuit for detecting the second voltage and providing a second signal representing the second voltage to the controller; and a switch circuit connected between the power source and the load and coupled to and controlled by the controller;

wherein the controller issue a control signal to change the switch circuit from a first state to a second state based on the first and second signals and the first and second voltage references, selectively passing the first voltage through the switch circuit and inducing different levels of the second voltage which are associated with different powers supplied to the load.

2. The power regulation device as claimed in claim 1 further comprising a current detection circuit for detection of a current flowing through the load, comprising a current detection element connected in series between the power source and the load which generates a third signal representing the current, the third signal being applied to the controller.

3. The power regulation device as claimed in claim 1, further comprising a filter circuit connected between the switch circuit and the load.

4. The power regulation device as claimed in claim 1 further comprising a display unit for displaying information regarding the first and second voltages and a current flowing through the load.

5. The power regulation device as claimed in claim 1, wherein the first voltage detection circuit comprises a voltage phase detection circuit for detecting of zero-crossing point of the first voltage and, in response to the detection, generating a voltage phase signal to the controller.

6. The power regulation device as claimed in claim 2, wherein the current detection circuit comprises a current phase detection circuit for detecting of zero-crossing point of the current flowing through the load and, in response to the detection, generating a current phase signal to the controller.

7. The power regulation device as claimed in claim 1, wherein the second voltage detection circuit comprises a voltage amplifier having two input terminals respectively connected to terminals of the load and an output terminal connected to an analog-to-digital converter for forming a voltage feedback signal in digital form that is applied to the controller.

8. The power regulation device as claimed in claim 1, wherein the switch circuit comprises a solid state switch element controlled by the controller to switch between the first and second states for regulating the power supplied to the load.

9. The power regulation device as claimed in claim 8, wherein the solid state switch comprises a triac having a conducting angle controlled by the controller for regulating the power supplied to the load.

10. The power regulation device as claimed in claim 8, wherein the solid state switch comprises a high speed transistor which is controlled by the controller to generate a series of pulses having a duty cycle controllable to regulate the power supplied to the load.

11. The power regulation device as claimed in claim 8, wherein the switch circuit further comprises a bypass switch element connected in parallel with the solid state switch element and the filter circuit, the bypass switch element being controlled by the controller to be selectively closed.

* * * * *